United States Patent [19]
Sirvet et al.

[11] 3,766,851
[45] Oct. 23, 1973

[54] CONTINUOUS CAN PRINTER AND HANDLING APPARATUS

[75] Inventors: Enn Sirvet, Washington Township; John P. Skrypek, Saddle Brook; Edward J. Whelan, Hasbrouck Heights, all of N.J.

[73] Assignee: Sun Chemical Corporation, New York, N.Y.

[22] Filed: Nov. 15, 1971

[21] Appl. No.: 198,618

[52] U.S. Cl. .................. 101/40, 198/22, 198/25, 214/1 BA, 214/1 BS
[51] Int. Cl. .............................. B41f 17/20
[58] Field of Search ........................
101/38-40; 198/20, DIG. 8, 22, 25, 185; 214/1 BB, 1 BA, 1 BS

[56] References Cited
UNITED STATES PATENTS

| | | | |
|---|---|---|---|
| 3,563,170 | 2/1971 | Cvacho et al. | 101/40 |
| 3,231,061 | 1/1966 | Borkmann | 101/40 UX |
| 3,677,273 | 7/1972 | Mahlstede et al. | 198/22 B X |
| 3,613,571 | 10/1971 | Russell et al. | 101/40 |
| 3,598,043 | 8/1971 | Schuff | 101/40 |
| 3,616,778 | 11/1971 | Sirvet et al. | 118/262 |
| 3,016,153 | 1/1962 | Porterfield | 101/40 UX |
| 3,469,670 | 9/1969 | Cartwright | 101/40 UX |

*Primary Examiner*—Robert E. Pulfrey
*Assistant Examiner*—Clifford D. Crowder
*Attorney*—Cynthia Berlow

[57] ABSTRACT

A continuous can printer is constructed with a worm and star-wheel type input conveyor which delivers undecorated cans to cradles mounted along the periphery of a rotating carrier. The loaded cradles move axially to transfer the cans to horizontal spindles mounted on the same carrier and thereafter suction is applied to firmly seat cans on the spindles. The loaded spindles are positively controlled for radial movement whereby improperly loaded cans are positioned for ejection and properly loaded cans are positioned to engage the image transfer blanket of a printing unit, thereafter engage the applicator roll of an overvarnish unit, and then be transferred to a suction cup on a rotating wheel-type carrier of a transfer unit through the application of high pressure air at the spindle and the application of a vacuum at the suction cup. Controlled radial movement of the suction cups matches speed and path of movement thereof at a transfer region to the speed and path of pins on a conveyor chain that extends through a curing oven. At the transfer region the conveyor chain moves along an inclined path while the transfer carrier rotates on a horizontal axis so that in the transfer region the conveyor pins move toward the transfer carrier to enter cans carried by the suction cups. In the transfer region controlled axial movement of the suction cups gradually displaces them toward the conveyor pins. At the outfeed end of the transfer region each conveyor pin is entered well into a can and this can falls free of its holding suction cup when the vacuum thereat is released.

12 Claims, 15 Drawing Figures

CONTINUOUS CAN PRINTER AND HANDLING APPARATUS

This invention relates generally to high-speed apparatus for handling cylindrical articles, and more particularly relates to improvements of the apparatus disclosed in U. S. Pat. Nos. 3,548,745 issued Dec. 22, 1970 to E. J. Whelan, J. P. Skrypek and E. Sirvet for a Mandril Assembly for Continuous Can Printing; 3,567,043 issued Mar. 2, 1971 to the aforesaid E. J. Whelan, J. P. Skrypek and E. Sirvet for a Transfer Assembly for Use with Container Printing Machine; and 3,586,175 issued June 22, 1971 to J. A. Gauld for a Transfer Assembly for Use with Container Printing Machine. The cylindrical articles handled by the aforesaid apparatus preferably constitute the cylindrical sidewall and integrally formed endwall of a two piece aluminum can.

At the time when the inventions of the aforesaid U. S. Pat. Nos. 3,548,745, 3,567,043 and 3,586,175 were made, apparatus constructed in accordance with such inventions operated at relatively high speeds and required relatively little downtime for repairs and service. However, as higher operating speeds became more desirable it was apparent that apparatus constructed in accordance with the prior art was not capable of achieving reliable operation at speeds as high as those desired.

Briefly, the apparatus of both the instant invention and the three aforesaid patents includes a worm and star-wheel type infeed conveyor which deposits undecorated cans open at one end onto cradles along the periphery of a wheel-like carrier rotated in coordination with star-wheel rotation. The cans engage a stationary cam bar and are deflected axially from the cradles to spindles mounted on horizontal axes secured to the carrier for the cradles. Undecorated cans on the spindles move into engagement with the image transfer blanket of a printer and thereafter move into engagement with the applicator roll of an overvarnish unit. The decorated cans are removed from the spindles and held by the suction cups of a continuously moving transfer conveyor which delivers the decorated cans to pins mounted on an output conveyor which moves decorated cans through a curing oven.

Improved reliability and higher speed is obtained by the instant invention preincipally through the following improvements, including bodily moving the can carrying cradles axially toward the spindle wheels to bodily carry each can onto an individual spindle. This avoids cocking of the cans as so often occurs during high-speed operation of prior art apparatus which utilized a stationary cam that engaged the closed end of the can to force the can axially onto the cradle. Utilizing this stationary cam, damaged cans were often forced onto the spindles and could not be conveniently removed. In the instant invention a resilient finger on each cradle engages the closed end of the can, with this finger being deflectable rearwardly in the event there is interference between a can and a spindle. Rotatable valve elements connect the spindles to suction or to air under pressure for predetermined angular positions of the spindles. The valve elements are continuously moving relative to one another, with improvements in this area being obtained by moving the valve elements relatively close to the center of rotation of the spindle carrying wheel and also by concealing the valve elements for all angular positions thereof. Proximity of the relatively moving valve elements to the center of rotation reduces their relative speeds to reduce wear, and concealment of the valve elements reduces the likelihood of contaminating particles entering the vacuum and air pressure system.

In the apparatus of the instant invention the transfer section includes a rotatable rigid wheel-type carrier to which the suction cup holding elements are mounted for both radial and axial movements, with these movements being controlled by independent cams. In order to obtain large relative movement between the oven conveyor pins and the suction cup holding elements during transfer of decorated cans from the latter to the former, as the suction cup holding elements are moved axially towards the oven conveyor, the pins of the latter move longitudinally toward the transfer carrier wheel. The latter is accomplished by having the plane of movement of the oven conveyor chain be inclined and having the transfer wheel rotate on a horizontal axis at a transfer region where cans are placed on the pins of the oven conveyor chain at the same time the suction cup moves axially toward the conveyor. Thus, in this transfer region the pins and the suction cup holding elements move along converging paths, with the pins entering deeply into the can until such time as the suction cups are vented to atmosphere thereby releasing the cans which now remain supported solely on the pins of the oven conveyor.

Accordingly, a primary object of the instant invention is to provide continuous can decorating apparatus which operates reliably at extremely high speed, and at lower speeds.

Another object is to provide apparatus of this type having improved means for loading of undecorated cans onto the spindles or mandrils which hold the cans during decorating thereof.

Still another object is to provide apparatus of this type having improved valve means to control the application of vacuum and high pressure air to the mandrils for loading and unloading thereof.

A further object is to provide apparatus of this type having a more rugged type construction for the transfer wheel mechanism.

A further object is to provide apparatus of this type in which the output conveyor holding pins and the transfer means suction cup holding elements move along converging paths, so that transfer of decorated cans from the latter to the former takes place without the necessity of utilizing high pressure air to blow the decorated cans onto the pins of the output conveyor.

These objects as well as other objects of this invention will become readily apparent after reading the following description of the accompanying drawings in which:

Figure 5:
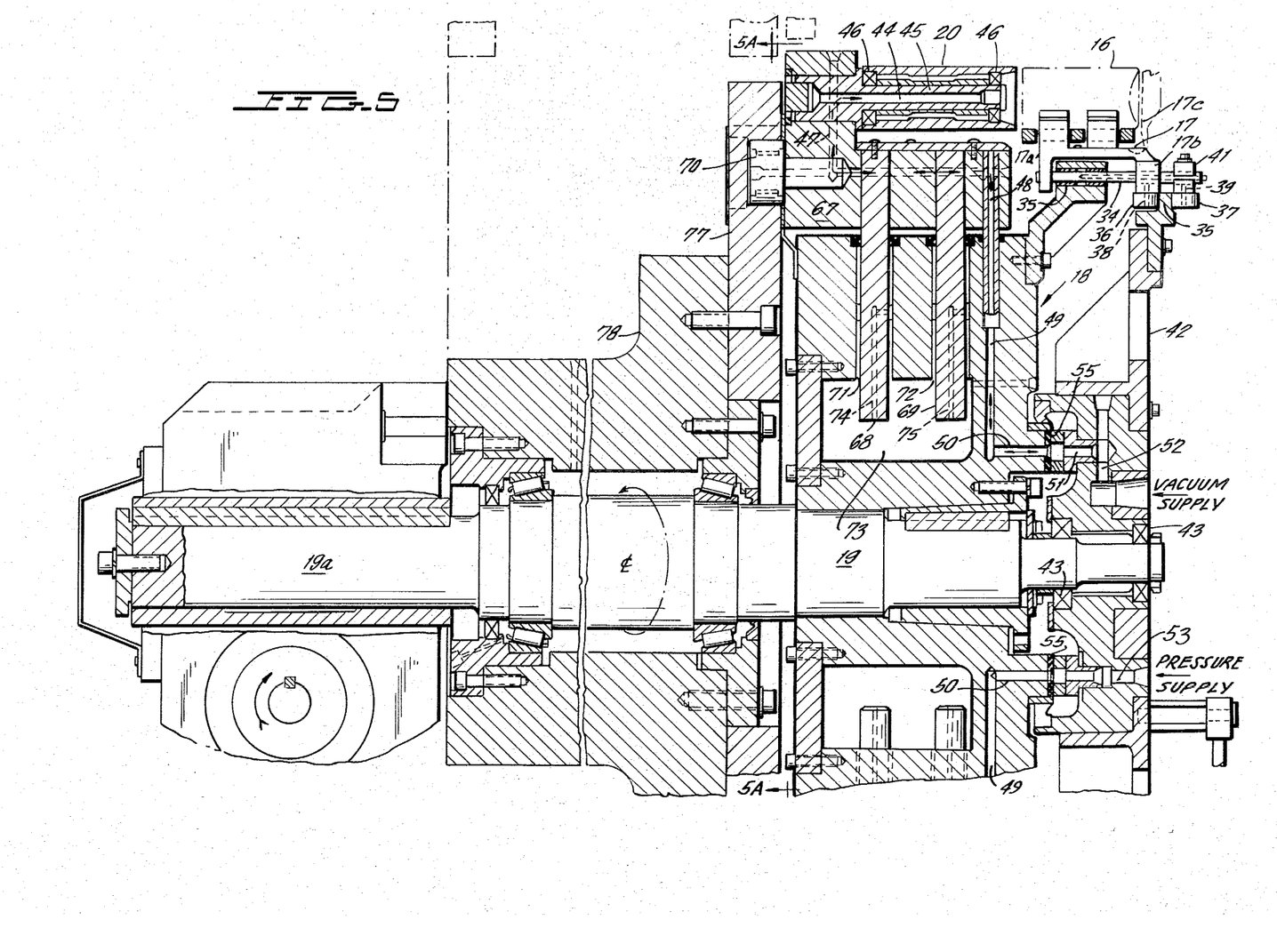
FIG. 5 is a cross-section through line 5—5 of FIG. 4, looking in the direction of arrows 5—5.
Figures 5A, 13, 14:
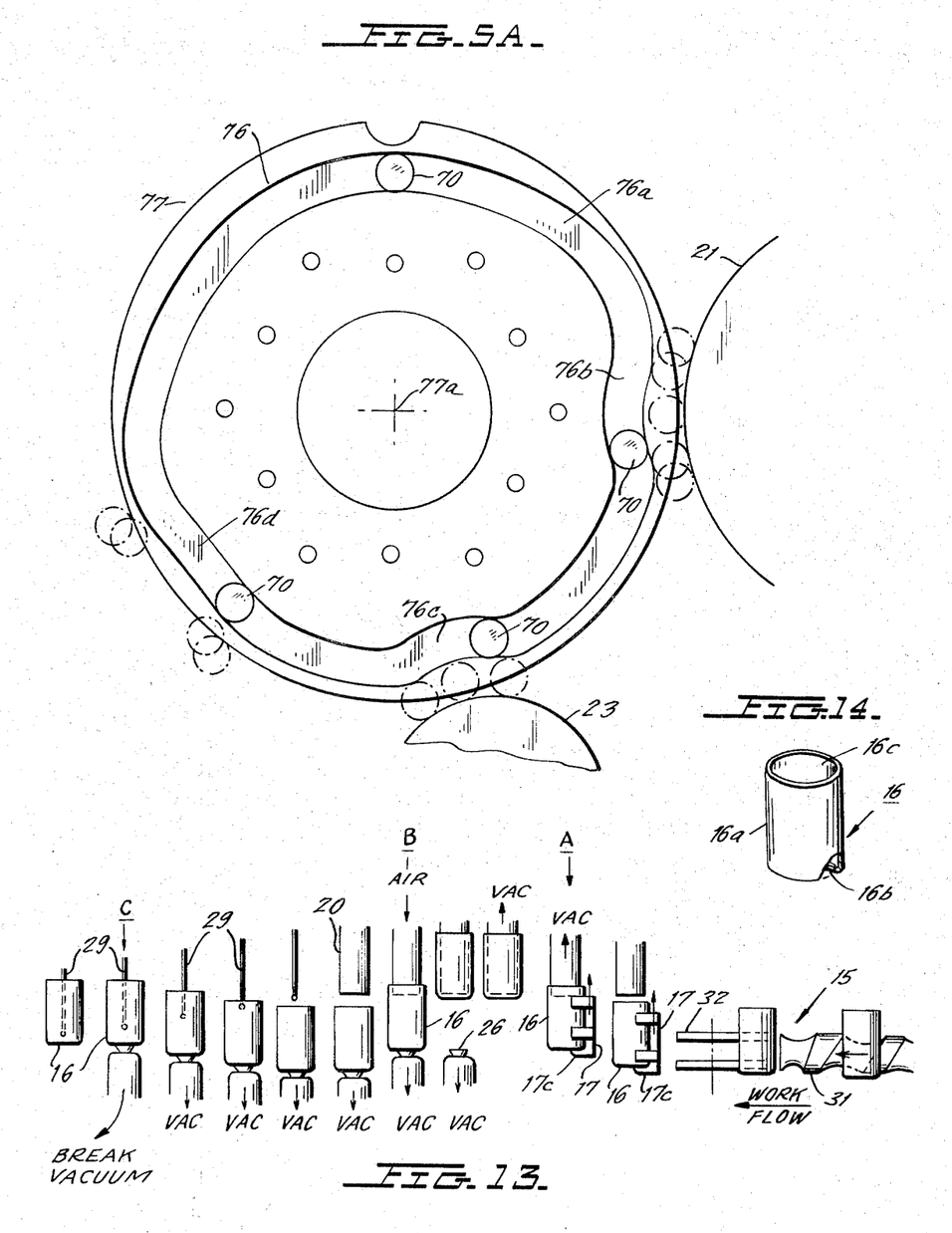
FIG. 5A is an elevation view looking in the direction of arrows 5A—5A of FIG. 5, illustrating the cam track for guiding radial movement of the spindles.
FIG. 13 is a schematic diagram showing the various transfer steps for a can passing through the apparatus of FIG. 1.
FIG. 14 is a perspective of a can that is processed by the apparatus of the instant invention.
Figures 6, 8, 9, 10:
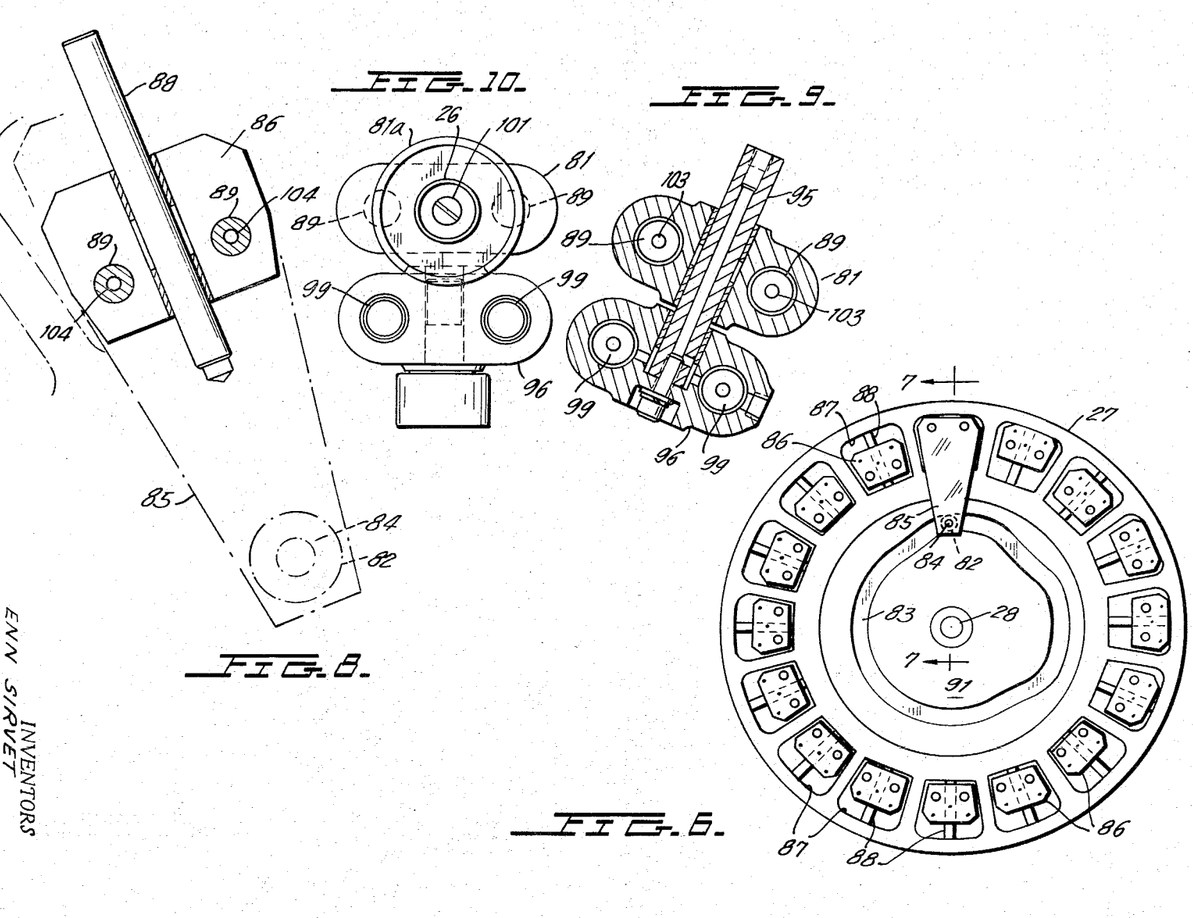
FIG. 6 is an elevation of the transfer wheel, looking in the direction of arrows 6—6 of FIG. 3.
FIGS. 8 and 9 are cross-sections taken through the respective lines 8—8 and 9—9 of FIG. 7, looking in the direction of the respective arrows 8—8 and 9—9.
FIG. 10 is an elevation of one of the suction holding elements of the transfer section, looking in the direction of arrows 10—10 of FIG. 7.
Figure 7:
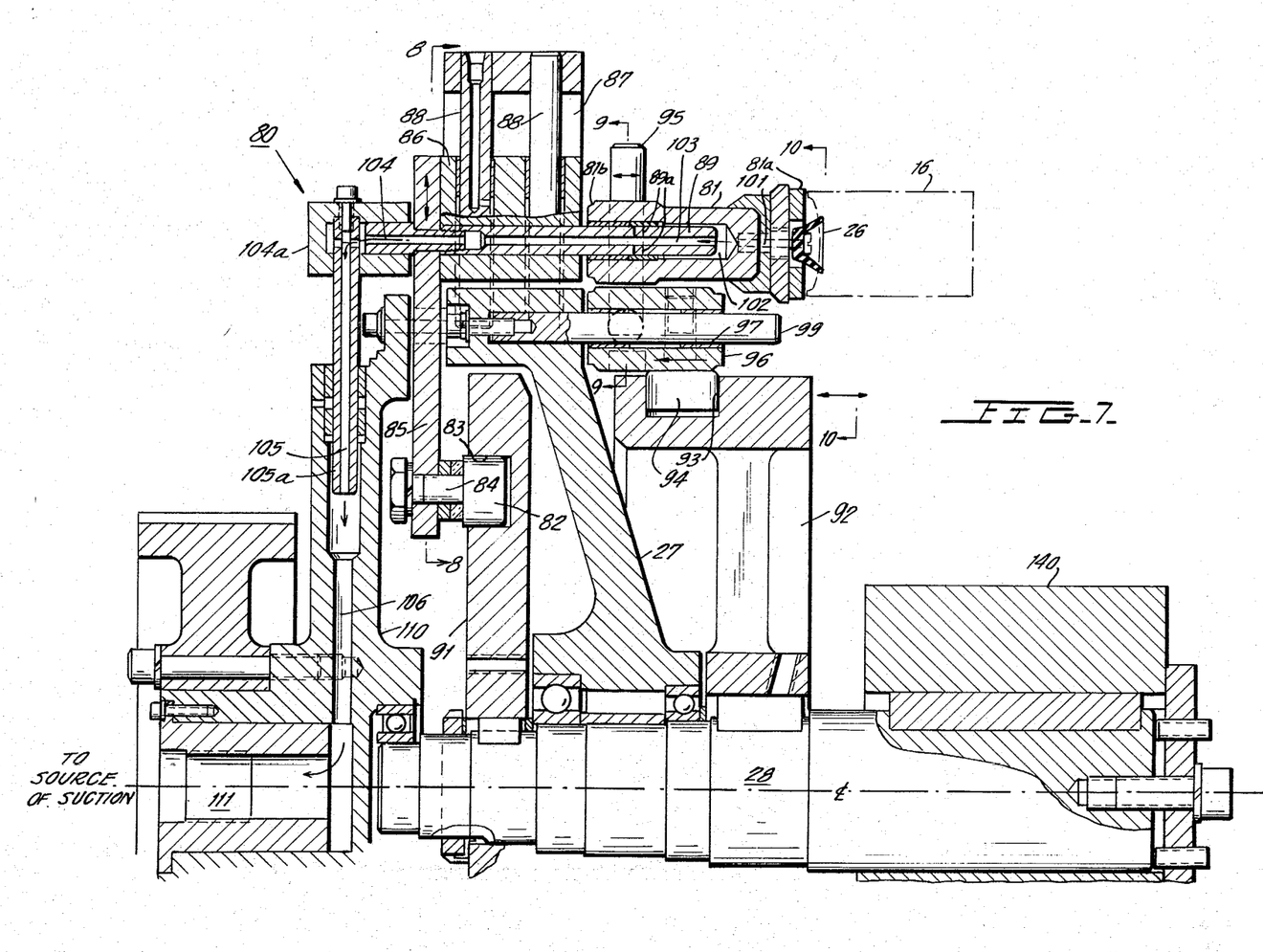
FIG. 7 is a cross-section taken through line 7—7 of FIG. 6, looking in the direction of arrows 7—7.

Now referring to the Figures. Can decorating apparatus shown in FIGS. 1, 2 and 3 includes infeed conveyor means 15 which receives undecorated cans 16 from a supply (not shown). As seen in FIG. 14, can 16 includes seamless cyclindrical side wall 16a having integrally formed concave bottom 16b and open top 16c. Conveyor means 15 places cans 16 onto cradles 17 located at the periphery of cradle wheel 18 that is continuously rotated by being keyed to horizontal shaft 19. Horizontal spindles or mandrils 20 are also mounted to wheel 18, with each spindle 20 being in angular alignment with an individual cradle 17 but being axially displaced therefrom. Undecorated cans 16 are transferred from cradles 17 to spindles 20 and while mounted to spindles 20 are decorated by being brought into engagement with rotating image transfer mat 21 of the printing or decorating section indicated generally by reference numeral 22. Thereafter, and while still mounted to spindles 20, cans 16 have a protective coat of varnish applied thereto as they engage the periphery of applicator roll 23 in overvarnsih unit indicated generally by reference numeral 24.

Cans 16 with decorations and protective coatings thereon are transferred from spindles 20 to suction cups 26 mounted to transfer wheel 27 near the periphery thereof. Transfer wheel 27 is continuously rotated about shaft 28 as a center. Cans 16 carried by suction cups 26 are then deposited on generally horizontal pins 29 carried by chain-type output conveyor 30 which carries cans 16 through a curing oven (not shown).

It is noted that decorating unit 22 is of the type described in detail in U. S. Pat. No. 3,223,028 issued Dec. 14, 1965 to W. E. Brigham for an Interchangeable Inking Unit for Multi-Color Presses. Overvarnish unit 24 is of the type described in U. S. Pat. No. 3,616,778 issued Nov. 2, 1971 to E. Sirvet, J. P. Skrypek and E. J. Whelan for an Overvarnish Assembly for Continuous Can Printing Machine.

Figure 1:
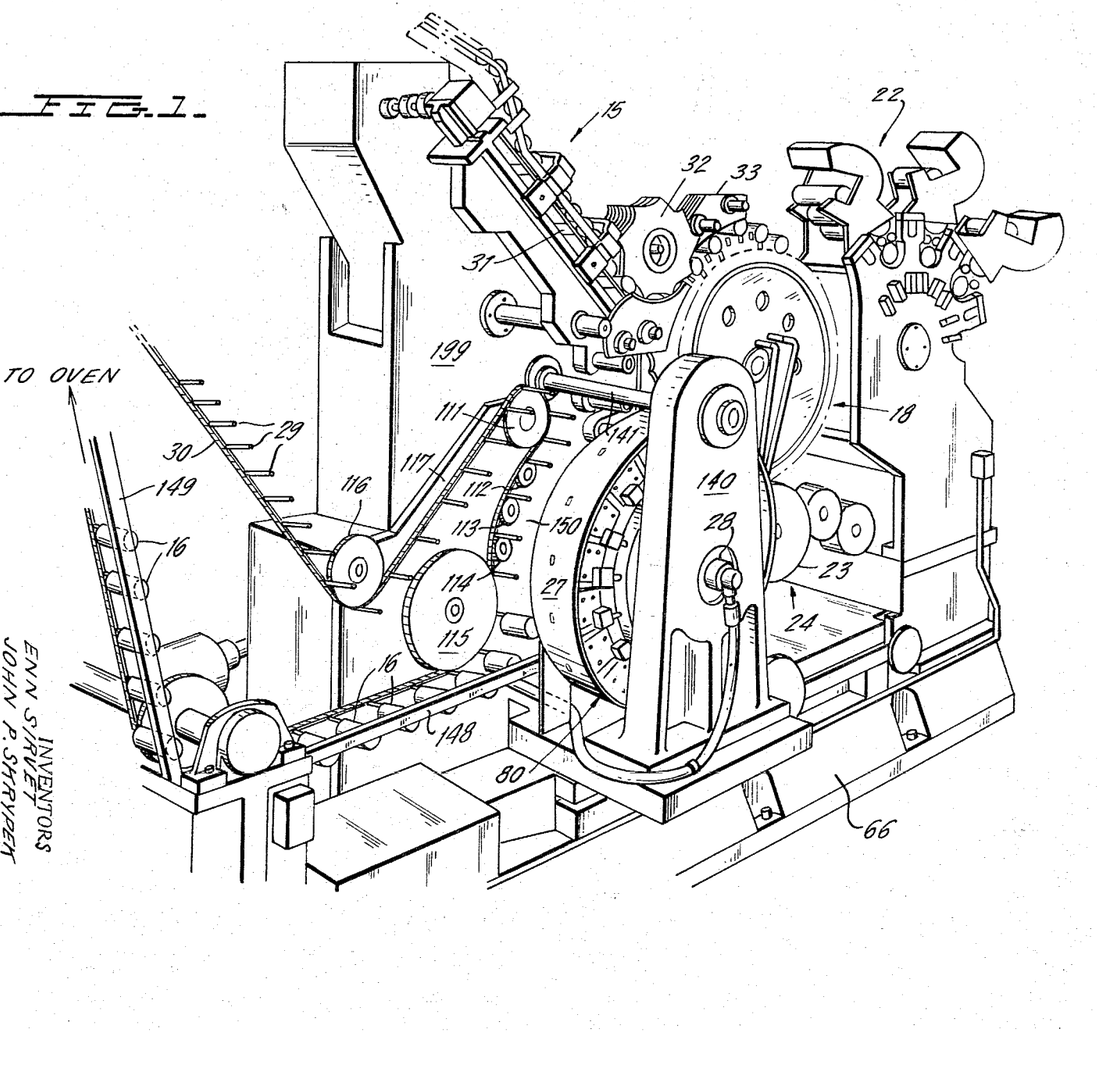
FIG. 1 is a perspective of continuous can printing apparatus constructed in accordance with teachings of the instant invention.
Figure 2:
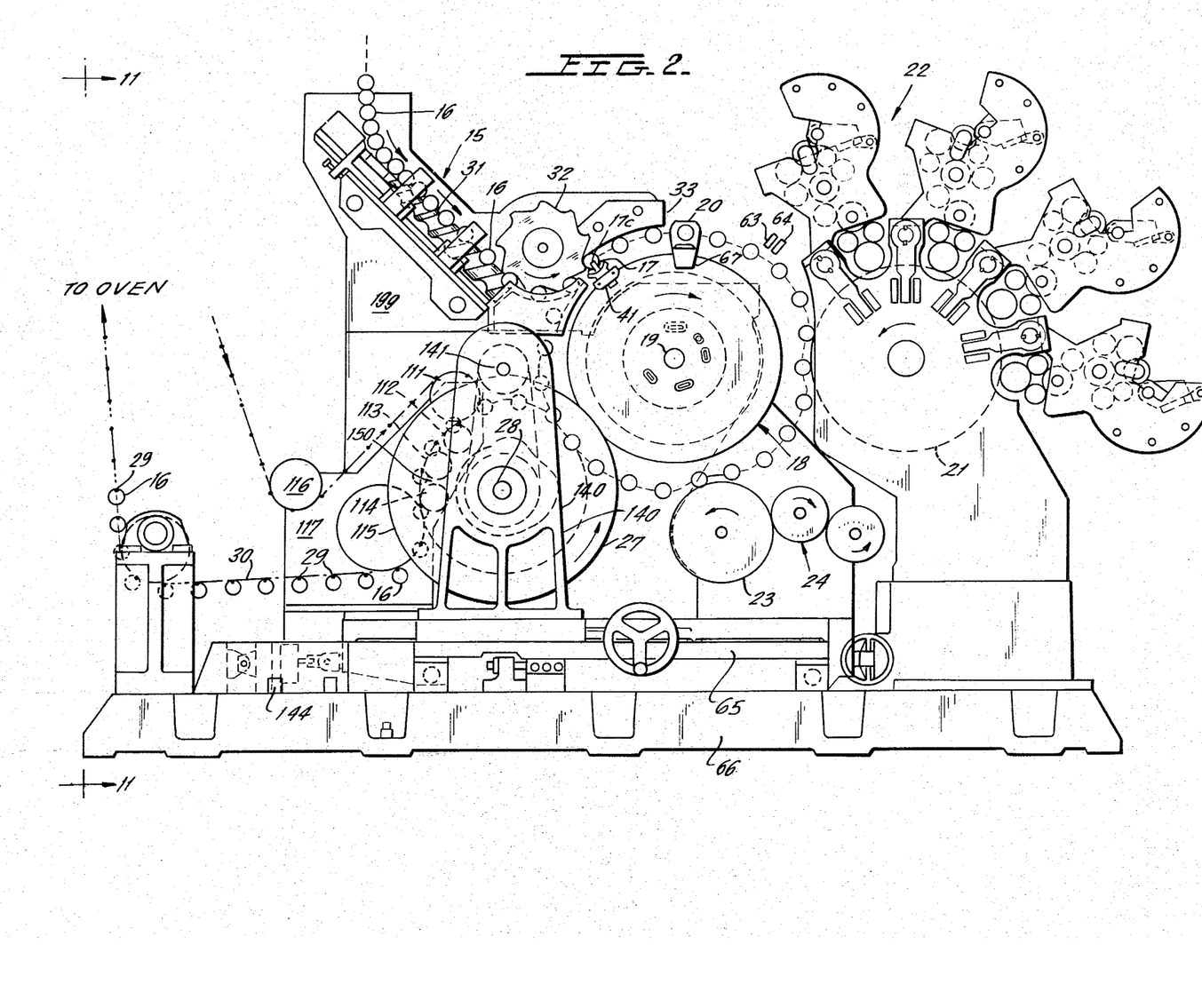
FIG. 2 is a front elevation of the apparatus of FIG. 1.
Figure 3:
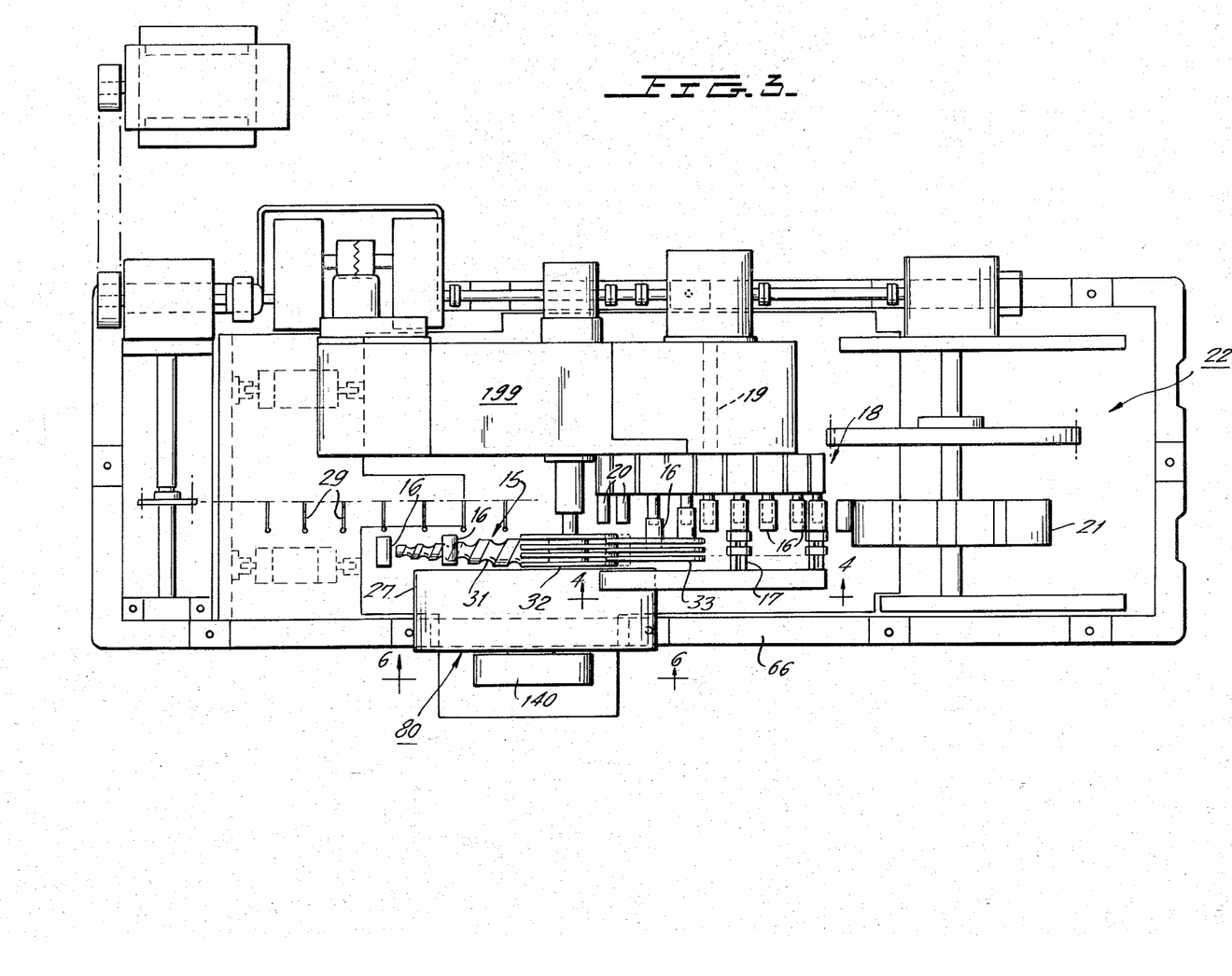
FIG. 3 is a plan view of the apparatus of FIG. 2.

Input conveyor 15 includes a conventional inclined roating screw or worm 31 that moves cans 16 down and toward the right with respect to FIGS. 1 and 2, delivering cans 16 to star-wheel 32. The plate-like sections of star-wheel 32 are interleaved with the plate-like sections of guide 33 which extends partly along the periphery of carrier wheel 18 at the portion thereof having cradles 17. Each cradle 17 is provided with a curved outer surface upon which cans 16 are seated, and a pair of legs 17a, 17b projecting radially inward having guide rods 34 extending therebetween. Rods 34 also extend through horizontal guide bores 35 in carrier wheel 18 to cooperate therewith in guiding cradle 17 for movement parallel to the axis of shaft 19.

This axial movement of cradle 17 is under the control of cam 35 which is sandwiched between followers 36, 37 freely mounted on the respective spindles 38, 39 which extend radially inward from cradle extension 17b and block 41, the latter being clamped to rods 34. Circular cam 35 is fixedly secured to disk 42 along the periphery thereof. Disk 42 is fixed against rotation and mounts bearings 43 supporting the end of rotating shaft 19 opposite to its driven end 19a at vertical frame section 199. The shape of cam 35 is such that after can 16 is deposited on cradle 17 the latter is moved from right to left with respect to FIG. 5 so that spindle 20 is entered a short distance into open end 16c of can 16 as in the position of cradle 17 illustrated at A in FIG. 13. Thereafter, can 16 is drawn completely onto spindle 20 by the application of a vacuum through axial passage 44 of horizontal post 45 that rotatably supports spindle 20 on bearings 46. After can 16 is withdrawn from cradle 17, the latter is moved axially away from spindle 20 so that cradles 17 will not be dirtied as they move adjacent to the print 22 and overvarnish 24 units.

Passage 44 is connected to a vacuum source (not shown) by passages 47, 48, 49, 50, 51 and 52. The latter two passages are through stationary disk 42, and the remaining passages 47–50 are through rotating elements. For a reason which will hereinafter be seen, for predetermined angular positions of each spindle 20, air under pressure is applied thereto through passages 44 and 47–50. This application of high pressure takes place through passage 53 in stationary disk 42. Interface 55 between the valve elements formed by the right end of rotating passage 50 and the left ends of the vacuum and pressure passages of stationary member 42, when viewed in FIG. 5, is located relatively close to axis 19 of member 18, thereby reducing the lineal speed between these valve elements to reduce wear thereof.

Figure 4:
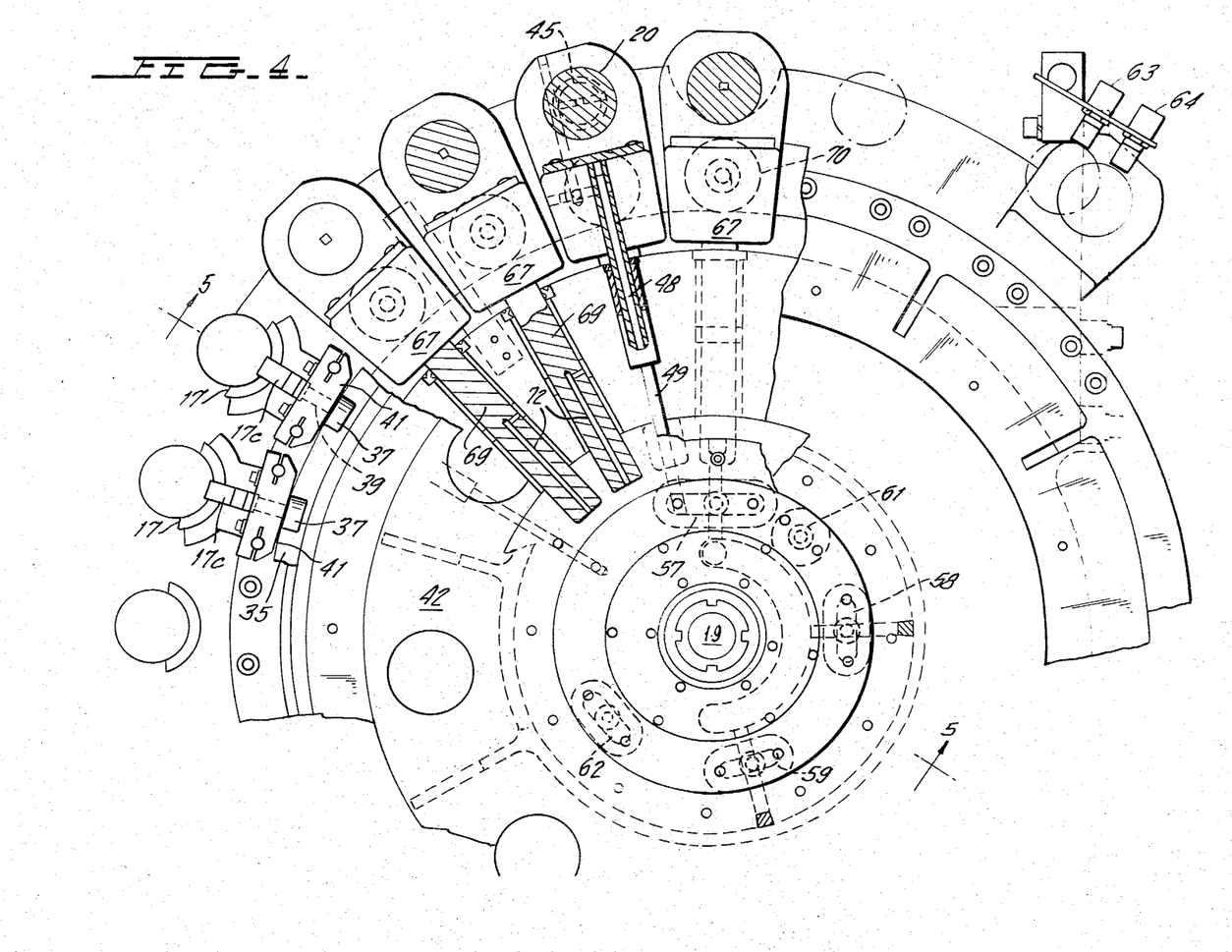
FIG. 4 is a partially sectioned fragmentary front elevation of the cradle wheel, looking in the direction of arrows 4—4 of FIG. 3.

The areas designated 57, 58, 59 in FIG. 4 are portions of the stationary interface whereat a vacuum is drawn, and those areas designated 61 and 62 in FIG. 4 are those stationary interface areas having air under pressure. At region 57 can 16 is drawn from cradle 17 and fully seated on spindle 20. At region 58 can 16 is firmly held on spindle 20 during the printing operation at which time the overspeed of printing transfer blanket 21 with respect to spindle carrier 18 causes rotation of can 20 about stem 45 so taht the entire surface of can 16 comes into contact with image transfer blanket 21. A similar operation takes place when can 16 engages varnish application roll 23 during which time can 16 is firmly held to spindle 20 by vacuum applied at interface region 59.

The high pressure at interface region 61 is effective to blow can 16 off of spindle 20 should either of the proximity sensors 63, 64 detect an undesirable condition. That is, sensor 63 becomes active in the event there is no can on spindle 20 as the latter passes sensor 63. Sensor 64 is activated by a can 16 that is not fully seated on spindle 20. At interface region 62 can 16 is blown from spindle 20 and is engaged by transfer means suction cup 26, as at position B in FIG. 13. It is noted that signals generated through the actuation of either of the sensors 63, 64 are also effective to move unloaded spindles 20 away from image transfer blanket 21 by controlling double acting cylinder 144 (FIG. 2) to move sub-frame 65, having spindle carrier shaft 19 mounted thereto, to the left with respect to FIG. 2, while main base 66 to which printing unit 22 is mounted remains stationary. Further, actuation of either sensors 63 or 64 causes overvarnish unit 24 to move downward with respect to spindle carrying shaft 19 so that unloaded spindles 20 do not engage overvarnish application roll 23.

Spindle carrying post 45 is fixedly secured to support block 67 having posts 68, 69 extending radially inward therefrom into complementary guide apertures 71, 72 extending radially inward from the edge of spindle carrier 18 into reservoir 73 which stores lubricant (not shown) that is pumped through passages 74, 75 in the respective posts 71, 72 to the exteriors thereof. Cam follower rollers 70, freely mounted for rotation at the end of block 67 remote from cradle 17, extends into cam slot 76 (FIG. 5A) formed in disk 77 that is fixedly secured to relatively stationary frame element 78. The center 77a of disk 77 coincides with the longitudinal axis of shaft 19 so that as carrier 18 rotates the cooperation between follower 70 and cam track 76 causes radial motion of spindle 20. The rise in cam 76 at region 76a thereof moves spindle 20 radially outward to clear spring finger 17c at the end of cradle 17 remote from spindle 20, so that spring finger 17c will not interfere with the ejection of damaged or defectively loaded cans from spindle 20. The curve in cam 76 at region 76b thereof causes spindles 20 to move in a path parallel to the periphery of image transfer blanket 21 and at the proper differential speed with respect thereto. The curve in cam slot 76 at region 76c thereof causes spindles 20 to move in a path parallel to the outer surface of varnish application roll 23 at proper differential speed with respect thereto, and the curve in cam slot 76 at region 76d thereof causes spindle 20 to move in alignment with suction cups 26 and at the speed thereat for transfer of decorated cans 16 to the latter.

Now referring more particularly to FIGS. 6–10, transfer assembly 80 is mounted on shaft 28 extending horizontally from frame post 140. Drive shaft 141 extends horizontally from the upper end of post 140 to vertical frame 199. Assembly 80 includes a plurality of suction cups 26 each mounted to extension 81a at the end of horizontally disposed head 81 confronting spindles 20. Head 81 is driven radially with respect to shaft 28 during rotation of carrier 27 as a result of the cooperation of follower roller 82 in cam track 83. Follower roller 82 is freely mounted for rotation about shaft 84 at the lower end of arm 85. The upper end of arm 85 is fixedly secured to block 86 mounted in window 87 of carrier 27 on a pair of radially extending guide rods 88. A pair of guide rods 89 extending parallel to carrier shaft 28 connects head 81 to member 86 for radial movement in unison therewith. Shaft 28 is located against rotation, with disk 91 bearing cam track 83 being keyed to shaft 28 together with wheel-like member 92 having cam track 93 cut in the periphery thereof. Follower 94 riding in cam track 93 is freely mounted for rotation upon an axis extending radially with respect to shaft 28 and parallel to post 95. The latter extends radially outward from guide member 96 having apertures 97 which receive guide rods 99 extending from transfer carrier 27 parallel to axis 28 thereof. Axial motion derived from the cooperation of carrier 93 with cam slot 94 is imparted to head 81 through the mechanical connection between block 96 and rod 95.

Most of the time suction is applied to suction cup 26 through passage 101 in head extension 81a, passage 102 in head 81, passages 103 in tubes 89, passage 104 in the axial extension of member 104a, central passage 105 in post 105a and radial passage 106 in member 110 which is mechanically connected to carrier 27 for rotation in unison therewith, and finally through passage 111 in alignment with the longitudinal axis of shaft 28. Thus, as carrier 27 rotates with respect to cam carrying stationary members 91 and 92, cam tracks 83, 93 impart respective radial and axial motions to suction cup carrying heads 81. When the end 81b of head 81 remote from suction cup 26 moves to the right of relief ports 89a, as viewed in FIG. 7, suction cup 26 is connected to atmosphere rather than having vacuum applied thereat, as in position C of FIG. 13, whereby decorated cans 16 drop onto oven conveyor pins 29.

Figures 11, 12:
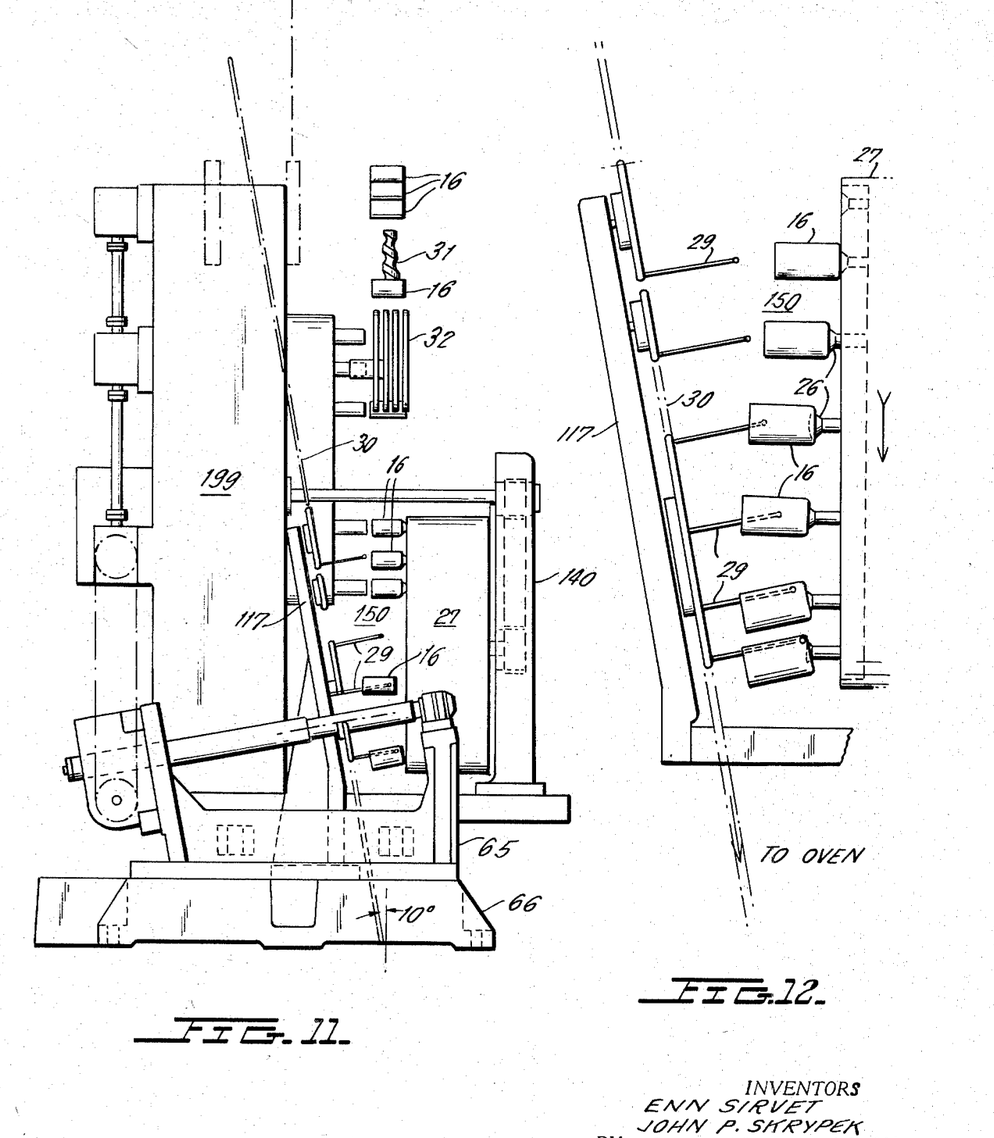
FIG. 11 is an end view of the continuous can printing apparatus, looking in the direction of arrows 11—11 of FIG. 2.
FIG. 12 is a portion of FIG. 11 drawn on an enlarged scale.

The axis of rotation for transfer carrier 27 is defined by horizontal shaft 28. However, in transfer region 150 illustrated most clearly in FIGS. 11 and 12, where cans 16 are transferred from suction cups 26 to pins 29 on oven conveyor chain 30, guide sprockets 111 through 116 for chain 30 are mounted on stub shafts extending at right angles to support plate that is inclined by approximately 10° with respect to the vertical. Thus, in transfer region 150 pins 29 move on a downward incline toward transfer assembly carrier wheel 27. At the same time the action of cam follower 94 in cam slot 93 drives suction cups 26 axially toward conveyor chain 30. Thus, in transfer region 150 suction cups 26 and pins 29 converge, and as they do pins 29 enter deeply into cans 16 during relatively little travel of conveyor chain 30. The shape of cam slot 83 and the relative speeds of conveyor 30 and suction cup carrier 27 are such that at the transfer region 150, suction cups 26 and oven conveyor pins 29 are moving at the same speed so that pins 29 do not contact can 16 until exhaust ports 89a are cleared by head 81 and suction cups 26 no longer exert holding forces on cans 16.

It is noted that the axial motion of suction cups 26 is controlled so that cups 26 move outward to receive cans 16 down from spindles 20. Then suction cups 26 are retracted, and are thereafter extended in transfer region 150.

Guide rails 148, 149 extend generally parallel to those flights of chains 30 loaded with cans 16 that have been carried past sprocket 115. Guide rails 148, 149 are positioned opposite closed ends 16b of cans 16 so as to prevent cans 16 from falling from the very fast moving pins 29.

Thus, it is seen that the instant invention provides novel continuous can printing apparatus that operates at low, intermediate and very high speeds with great reliability. Some of the salient features contributing to reliable high-speed operation are the axial movement of cradle 17 to bodily move can 16 onto spindle 20; deflectable spring finger 17c on cradle 17 to prevent forced loading of a deflective can 16 on spindle 17; the shape of cam slot 76 to control radial movement of spindles 20 so that the position and speed thereof are proper for ejecting defective cans 16, for engaging image transfer blanket 21, for engaging lacquer applicator roll 23, and for transferring decorated cans 16 from spindles 20 to suction cups 26; utilization of rigid wheel-type carrier 27 to support suction cups 26; coordinating the speeds and positions of suction cups 26 and oven conveyor pins 29 so that cans 16 are transferred to pins 29 from cups 26 in a relatively short transfer region 150 and there is no rubbing of can bottom 16c against suction cup 26 during the transfer; and the construction of the transfer means which makes possible rapid transfer of decorated cans 16 from suction cups 26 to oven conveyor pins 29 without the necessity of utilizing air under pressure.

Although there has been described a preferred embodiment of this novel invention, many variations and modifications will now be apparent to those skilled in the art. Therefore, this invention is to be limited not by the specific disclosure herein but only by the appending claims.

We claim:

1. Apparatus for decorating tubular articles including infeed conveyor means; continuously rotatable loading means which receives undecorated articles from said infeed conveyor means; a plurality of support elements to receive undecorated articles from said loading means and continuously rotatable carrier means supporting said elements in a generally circular array; decorating means operatively disposed to apply decorations to undecorated articles carried by said support elements; transfer means to receive decorated articles from said support elements; output conveyor means to receive decorated articles from said transfer means; said loading means including a plurality of cradles disposed in a generally circular array with each of said cradles receiving individual undecorated articles for each revolution of said loading means; cradle moving means for imparting axial movement in sequence to said cradles to transfer undecorated articles from said cradles to said support elements; and an individual deflectable means mounted to each of said cradles on the end thereof remote from said carrier means which is deflectable so as not to force loading of deflective articles onto said support elements.

2. Apparatus as set forth in claim 1 in which the transfer means includes a continuously operated conveyor; said output conveyor means including a plurality of carrying elements which enter into and thereby receive decorated articles from said transfer means at a transfer region; means defining a path for said output conveyor means such that in said transfer region said carrying elements move toward said transfer means in a first plane angularly disposed with respect to a second lane wherein said continuously operating conveyor moves; said carrying elements extending transverse to said first plane.

3. Apparatus as set forth in claim 2 also including a suction source and pressure source, and valving means for connecting the respective sources to each of said support elements at predetermined angular positions thereof; said valving means including cooperating relatively stationary and relatively movable sections in abutting relationship at an interface plane disposed generally at right angles to the rotational axis for said carrier means; said relatively movable section being connected with said rotatable carrier means for rotation in unison therewith; said stationary and movable sections being located relatively close to said axis whereby speed of relative movement between said sections is not excessive.

4. Apparatus as set forth in claim 3 in which said valving means is enclosed for all angular positions of said carrier means.

5. Apparatus for decorating tubular articles including infeed conveyor means; continuously rotatable loading means which receives undecorated articles from said infeed conveyor means; a plurality of support elements to receive undecorated articles from said loading means and continuously rotatable carrier means supporting said elements in a generally circular array; decorating means operatively disposed to apply decorations to undecorated articles carried by said support elements; transfer means to receive decorated articles from said support elements; output conveyor means to receive decorated articles from said transfer means; said loading means including a plurality of cradles disposed in a generally circular array with each of said cradles receiving individual undecorated articles as said loading means rotates; said transfer means including a continuously operating conveyor; said output conveyor means including a plurality of carrying elements which enter into and thereby receive decorated articles from said transfer means at a transfer region; means defining a path for said output conveyor means such that in said transfer region said carrying elements move toward said transfer means in a first plane angularly disposed with respect to a second plane wherein said continuously operating conveyor moves; said carrying elements extending transverse to said first plane.

6. Apparatus as set forth in claim 5 in which said transfer means includes a plurality of holding means and means active in said transfer region to move said holding means axially toward said output conveyor means.

7. Apparatus as set forth in claim 6 in which there is a wheel-type structure constituting the conveyor of said transfer means.

8. Apparatus as set forth in claim 5 in which said transfer means includes a plurality of holding means employing suction forces to hold decorated articles, with final transfer of articles from said holding means to said support elements resulting solely from discontinuance of said suction forces after said carrying elements are entered a substantial way into articles being held by said holding means.

9. Apparatus as set forth in claim 8 in which support elements do not contact articles while the latter are being held by said holding means.

10. Apparatus as set forth in claim 9 also including means active in said transfer region to move said holding means axially toward said output conveyor means.

11. Apparatus for decorating tubular articles including infeed conveyor means; continuously rotatable loading means which receives undecorated articles from said infeed conveyor means; a plurality of support elements to receive undecorated articles from said loading means and continuously rotatable carrier means supporting said elements in a generally circular array; decorating means operatively disposed to apply decorations to undecorated articles carried by said support elements; transfer means to receive decorated articles from said support elements; output conveyor means to receive decorated articles from said transfer means; said loading means including a plurality of cradles disposed in a generally circular array, with each of said cradles receiving individual undecorated articles for each revolution of said loading means; said transfer means including a continuously operating conveyor; said output conveyor means including a plurality of carrying elements which enter into and thereby receive decorated articles from said transfer means at a transfer region; a plurality of holding means carried by said continuously operating conveyor; means active in said transfer region to effect convergance of said holding means and said output conveyor means by directing movement of said carrying elements transverse to a plane in which said continuously operating conveyor moves; said holding means employing suction forces to hold decorated articles, with final transfer of articles from said holding means to said support elements resulting solely from discontinuance of said suction forces after said carrying elements are entered a substantial way into articles being held by said holding means.

12. Apparatus as set forth in claim 11 in which support elements do not contact articles while the latter are being held by said holding means.

* * * * *

UNITED STATES PATENT OFFICE
CERTIFICATE OF CORRECTION

Patent No. 3,766,851　　　　　　　　Dated October 23, 1973

Inventor(s) E. Sirvet, J.P. Skrypek, and E.J. Whelan

It is certified that error appears in the above-identified patent and that said Letters Patent are hereby corrected as shown below:

Column 1, line 8, change "Mandril" to -- Mandrel --; line 22, change "requred" to -- required --; line 45, change "is" to -- are --; line 46, change "preincipally" to -- principally --.

Column 2, line 14, change " towards" to -- toward --; line 31, delete the comma; line 35, change "mandrils" to -- mandrels --; line 39, change "mandrils" to -- mandrels --.

Column 3, line 30, change "mandrils" to -- mandrels --; line 41, change "overvarnsih" to -- overvarnish --.

Column 4, line 52, change "taht" to -- that --.

Column 7, line 51, change "lane" to -- plane --.

Column 9, line 7, change "convergance" to -- convergence --.

Signed and sealed this 2nd day of April 1974.

(SEAL)
Attest:

EDWARD M. FLETCHER, JR.　　　　　　C. MARSHALL DANN
Attesting Officer　　　　　　　　　　Commissioner of Patents